(12) United States Patent
Gao et al.

(10) Patent No.: US 9,318,962 B2
(45) Date of Patent: Apr. 19, 2016

(54) CIRCUITS AND METHODS FOR REDUCING OUTPUT VOLTAGE OVERSHOOT OF SWITCH MODE POWER SUPPLY

(71) Applicants: Chao Gao, Shanghai (CN); Pingan Zhao, Shanghai (CN); Chao Chen, Shanghai (CN)

(72) Inventors: Chao Gao, Shanghai (CN); Pingan Zhao, Shanghai (CN); Chao Chen, Shanghai (CN)

(73) Assignee: BCD Semiconductor Manufacturing Limited, Shanghai (CN)

( * ) Notice: Subject to any disclaimer, the term of this patent is extended or adjusted under 35 U.S.C. 154(b) by 625 days.

(21) Appl. No.: 13/708,922

(22) Filed: Dec. 7, 2012

(65) Prior Publication Data

US 2014/0016375 A1   Jan. 16, 2014

(51) Int. Cl.
   *G05F 3/16*   (2006.01)
   *H02M 3/335*   (2006.01)

(52) U.S. Cl.
   CPC ...... *H02M 3/33523* (2013.01); *H02M 3/33507* (2013.01)

(58) Field of Classification Search
   CPC .................................. G05F 3/16; G05F 3/227
   USPC ........ 363/21.12–21.18, 44, 52, 123, 125, 127
   See application file for complete search history.

(56) References Cited

U.S. PATENT DOCUMENTS

| | | | |
|---|---|---|---|
| 6,118,675 A * | 9/2000 | Lionetto et al. | 363/21.13 |
| 6,693,811 B1 * | 2/2004 | Bowman et al. | 363/97 |
| 7,239,532 B1 * | 7/2007 | Hsu et al. | 363/21.12 |
| 7,525,823 B2 * | 4/2009 | Piper et al. | 363/21.16 |
| 7,940,535 B2 * | 5/2011 | Itoh et al. | 363/21.12 |
| 8,891,259 B2 * | 11/2014 | Zhao et al. | 363/21.18 |
| 2008/0007977 A1 * | 1/2008 | Piper et al. | 363/21.16 |
| 2008/0265133 A1 * | 10/2008 | Sawtell et al. | 250/206 |
| 2009/0109711 A1 * | 4/2009 | Hsu | 363/21.14 |
| 2010/0103705 A1 * | 4/2010 | Fang et al. | 363/21.18 |
| 2011/0096573 A1 * | 4/2011 | Zhu et al. | 363/21.17 |
| 2011/0261596 A1 * | 10/2011 | Zong et al. | 363/21.13 |
| 2013/0051090 A1 * | 2/2013 | Xie et al. | 363/21.17 |
| 2013/0088898 A1 * | 4/2013 | Gao et al. | 363/21.16 |
| 2013/0294118 A1 * | 11/2013 | So et al. | 363/21.16 |
| 2013/0343101 A1 * | 12/2013 | Zhang et al. | 363/21.18 |
| 2014/0204625 A1 * | 7/2014 | Liu et al. | 363/21.13 |

FOREIGN PATENT DOCUMENTS

| | | |
|---|---|---|
| CN | 101752840 A | 6/2010 |
| CN | 101847934 A | 9/2010 |

OTHER PUBLICATIONS

China Intellectual Property Office office action for application CN201210241242.0 dated May 26, 2014.

* cited by examiner

*Primary Examiner* — Adolf Berhane
*Assistant Examiner* — Nusrat Quddus

(57) ABSTRACT

A switching mode power supply (SMPS) includes a transformer having a primary winding for coupling to an input power source, a secondary winding for providing an output voltage of the SMPS, and an auxiliary winding. The SMPS also has a power transistor coupled to the primary winding and a primary side control circuit coupled to the auxiliary winding and the power transistor. The primary side control circuit is configured to regulate the output of the SMPS by controlling the power switch in response to a feedback voltage signal that is representative of an output of the SMPS. The SMPs also has a secondary-side control circuit coupled to the secondary winding and being configured to cause the output voltage of the SMPS to discharge when the output voltage of the SMPS is higher than a first reference voltage.

16 Claims, 6 Drawing Sheets

CIRCUITS AND METHODS FOR REDUCING OUTPUT VOLTAGE OVERSHOOT OF SWITCH MODE POWER SUPPLY

CROSS-REFERENCES TO RELATED APPLICATIONS

This application claims priority to Chinese Patent Application No. 201210241242.0, filed Jul. 12, 2012, by inventors C. Gao, et al., commonly owned and incorporated in its entirety by reference herein for all purposes.

BACKGROUND OF THE INVENTION

This invention is generally related to switch mode power supplies (SMPS). More particularly, this invention is related to methods and circuits for improving the output characteristics of SMPS. Merely by way of example, the invention has been applied to reduce the output voltage overshoot of a pulse width modulated (PWM) or a pulse frequency modulated (PFM) switching mode power supply. But it would be recognized that the invention has a much broader range of applicability.

Switching mode power supplies (SMPS) have the advantages of smaller size, higher efficiency and larger output power capability, and are widely applied in mobile phone chargers, notebook computer adapters and other fields. In recent years, green power supplies are emphasized, which require higher conversion efficiency and especially lower standby power consumption. However, under certain operating conditions, for example, when the SMPS changes from a heavy load condition to a low load or no load condition, the output can overshoot. This can lead to output instability and power loss.

In view of the foregoing, there is a need for an effective technique to reduce the output voltage overshoot or overvoltage during load transients or dynamic load changes of switching mode power supplies.

BRIEF SUMMARY OF THE INVENTION

In accordance with embodiments of the present invention, a variety of techniques are described for reducing output voltage overshoot or over-voltage during load transient or dynamic load change of switching mode power supplies.

In various embodiments, the present invention provides methods and circuit implementations for detecting an overshoot or overvoltage condition at the output of the SMPS and discharging the output voltage at the secondary side. In some embodiments, when the system output voltage is higher than a predetermined value, a discharge signal is generated to cause discharge of the output voltage. The output overshoot or overvoltage thus can be reduced during conditions such as load transients or dynamic load changes of switching mode power supplies.

According to some embodiments of the present invention, a switching mode power supply (SMPS) includes a transformer having a primary winding for coupling to an input power source, a secondary winding for providing an output voltage of the SMPS, and an auxiliary winding. The SMPS also has a power transistor coupled to the primary winding and a primary side control circuit coupled to the auxiliary winding and the power transistor. The primary side control circuit is configured to regulate the output of the SMPS by controlling the power switch in response to a feedback voltage signal that is representative of an output of the SMPS. The SMPs also has a secondary-side control circuit coupled to the secondary winding and being configured to cause the output voltage of the SMPS to discharge when the output voltage of the SMPS is higher than a first reference voltage.

In some embodiments of the above SMPS, the secondary-side control circuit includes a discharge control circuit having a power supply terminal coupled to the output voltage of the SMPS. The discharge control circuit is configured to issue a discharge signal. In some embodiments, the discharge signal can be a pulsed signal. In some embodiments, the discharge control circuit is configured to provide a signal to cause the primary side control circuit to temporarily stop regulating the output of the SMPS when discharge is occurring on the secondary side. In some embodiments, the discharge control circuit includes a comparator having a negative input coupled to the second reference voltage and a positive input coupled to a third reference voltage that is lower than the second reference voltage. The comparator also has a power supply terminal coupled to the output voltage of the SMPS.

In some embodiments, the discharge control circuit also includes a first transistor coupling the power supply terminal of the discharge control circuit to a ground terminal. The first transistor also has a control terminal coupled to an output of the comparator. In some embodiments, the discharge control circuit also has a second transistor coupling the power supply terminal of the discharge control circuit to the output of the comparator. In a specific embodiment, the second transistor of the discharge control circuit is controlled by a first and a second flip-flops. The first flip-flop is coupled to a signal indicating that the output voltage of the SMPS is higher than the first reference voltage, and the second flip-flop is coupled to a delay signal.

In some embodiments, the discharge control circuit is configured such that the output voltage prevented from discharging to below the second reference voltage. In some embodiments of the SMPS, the primary side control circuit is a pulse width modulated (PWM) controller. In other embodiment the primary side control circuit is a pulse frequency modulated (PFM) controller.

According to other embodiments of the present invention, a three-terminal device for controlling a switching mode power supply (SMPS) includes a first terminal for coupling to the output of the switching mode power supply, a second terminal for coupling to a secondary side ground of the SMPS, and a third terminal for coupling to a secondary winding of the SMPS. The device also has a discharge control circuit coupled to the first terminal. The discharge control circuit is configured to issue a pulsed discharge signal to cause a voltage at the first terminal to discharge to the second terminal when the voltage at the first terminal is higher than a first reference voltage.

In some embodiments of the three-terminal device, the discharge control circuit includes a comparator having a negative input coupled to the second reference voltage and a positive input coupled to a third reference voltage that is lower than the second reference voltage. The comparator also has a power supply terminal coupled to the output voltage of the SMPS. In some embodiments, the discharge control circuit also includes a first transistor coupling the first terminal to the second terminal. The first transistor also has a control terminal coupled to an output of the comparator. In some embodiment, the discharge control circuit also includes a second transistor coupling the first terminal to the output of the comparator. In a specific embodiment, the second transistor is controlled by a first and a second flip-flops. The first flip-flop is coupled to a signal indicating that the voltage at the first terminal is higher than a first reference voltage, and the second flip-flop being coupled to a delay signal.

Some alternative embodiments of the invention provide a method of controlling the output of a switching mode power supply (SMPS), which includes a transformer having a primary winding coupled to a power switch, a secondary winding for providing an output, and an auxiliary winding. The method includes, on the primary side of the transformer, regulating the output of the SMPS by controlling the power switch in response to a feedback voltage signal that is representative of an output of the SMPS. The method also includes, on the secondary side of the transformer, causing the output voltage of the SMPS to discharge when the output voltage of the SMPS is higher than a first reference voltage.

In some embodiments, the above method also includes generating a pulsed discharge signal to cause the discharge. In some embodiments, generating the discharge signal includes detecting when the output voltage of the SMPS is higher than a first reference voltage and combining the result of the detection with a delay signal and a clock signal. In some embodiments, the method also includes temporarily halting the regulating of the output of the SMPS from the primary side, when discharge is occurring on the secondary side.

Some embodiments of the above method also includes providing a discharge control circuit that includes a comparator having a negative input coupled to the second reference voltage and a positive input coupled to a third reference voltage that is lower than the second reference voltage, the comparator also having a power supply terminal coupled to the output voltage of the SMPS. In some embodiment, the discharge control circuit also includes a first transistor coupling the power supply terminal of the discharge control terminal to a ground terminal. The first transistor also has a control terminal coupled to an output of the comparator. In some embodiments, the discharge control circuit further comprises a second transistor coupling the power supply terminal of the discharge control circuit to the output of the comparator.

Various additional embodiments, features, and advantages of the present invention can be appreciated with reference to the detailed description and accompanying drawings that follow.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
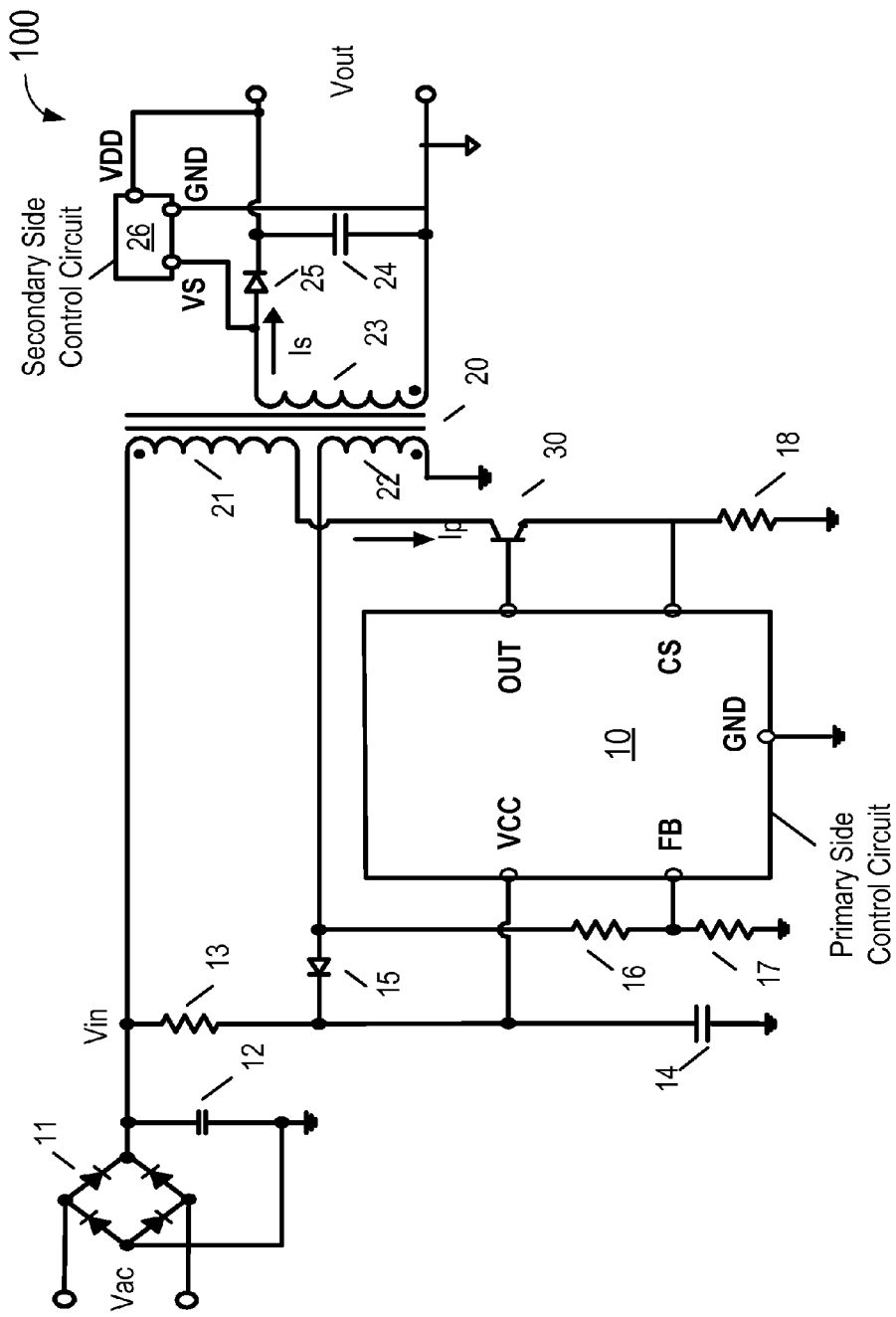
FIG. 1 a simplified schematic block illustrating a fly back switch mode power supply (SMPS) system according to embodiments of the present invention.

FIG. 1 a simplified schematic block illustrating a fly back switch mode power supply (SMPS) system 100 according to embodiments of the present invention. As shown in FIG. 1, SMPS 100 includes a primary-side controller 10 with a power supply terminal VCC, a feedback terminal FB, an output terminal OUT, and a current sense terminal CS. Depending on the application, controller 10 can be a PWM controller or a PFM controller. SMPS 100 also includes a transformer 20 that has a primary winding 21, a secondary winding 23, and an auxiliary winding 22. SMPS 100 also includes rectifying diodes 11 and capacitor 12 that rectifies an AC mains voltage source Vac to generate a rectified DC input voltage Vin. The rectified DC input voltage Vin supplies power to controller 10 at the power supply terminal VCC through a resistor 13 and a bypass capacitor 14 at start up. While in the normal operation mode, auxiliary winging 22 supplies power to controller 10 via a rectifier diode 15. Current sense terminal CS is coupled to a terminal of a bipolar transistor 30 to sense a primary current Ip flowing through primary winding 21 and power transistor 30. Resistors 16 and 17 form a voltage divider to reduce the induced voltage at auxiliary winding. The reduced voltage is fed back to controller 10 at input terminal FB to represent a state on the secondary side for further processing.

In FIG. 1, controller 10 delivers a control pulse signal at output terminal OUT to turn on and off a power switch 30, which in the embodiment of FIG. 1 is a bipolar transistor, but can also be an MOS transistor in other embodiments. Voltages are induced in the auxiliary and secondary windings when transistor 30 is turned off. Current flow Is in secondary winding 23 provides the output of the power supply Vout through a rectifying circuit including diode 25 and capacitor 24. Primary-side controller 10 is configured to regulate output voltage Vout to maintain a desired output.

As shown in FIG. 1, SMPS 100 also includes a secondary-side controller 26, which has three terminals Vs, GND, and VDD. Terminal Vs is coupled to secondary winding 23. Terminal GND is coupled to the ground terminal of secondary winding 23. Terminal VDD is coupled to SMPS output Vout. In embodiments of the present invention, secondary-side control circuit 26 is configured to control upper limit and lower limit of the output voltage. If the output voltage is lower than the lower limit, secondary-side control circuit 26 issues a signal to cause primary-side control circuit 10 to respond and provide electrical energy to the secondary side such that the output voltage does not fall below the lower limit. If the output voltage is higher than the upper limit, secondary-side control circuit 26 is configured to cause the secondary side to discharge to prevent the output voltage from becoming too high.

In conventional power supplies, under certain conditions, for example, when the system switches suddenly from a heavy load condition to a no load condition, the system is not capable of lowering the output voltage quickly from an overshoot condition to a pre-set no-load voltage. As a result, the power supply stays in the overshoot condition.

Figure 2:
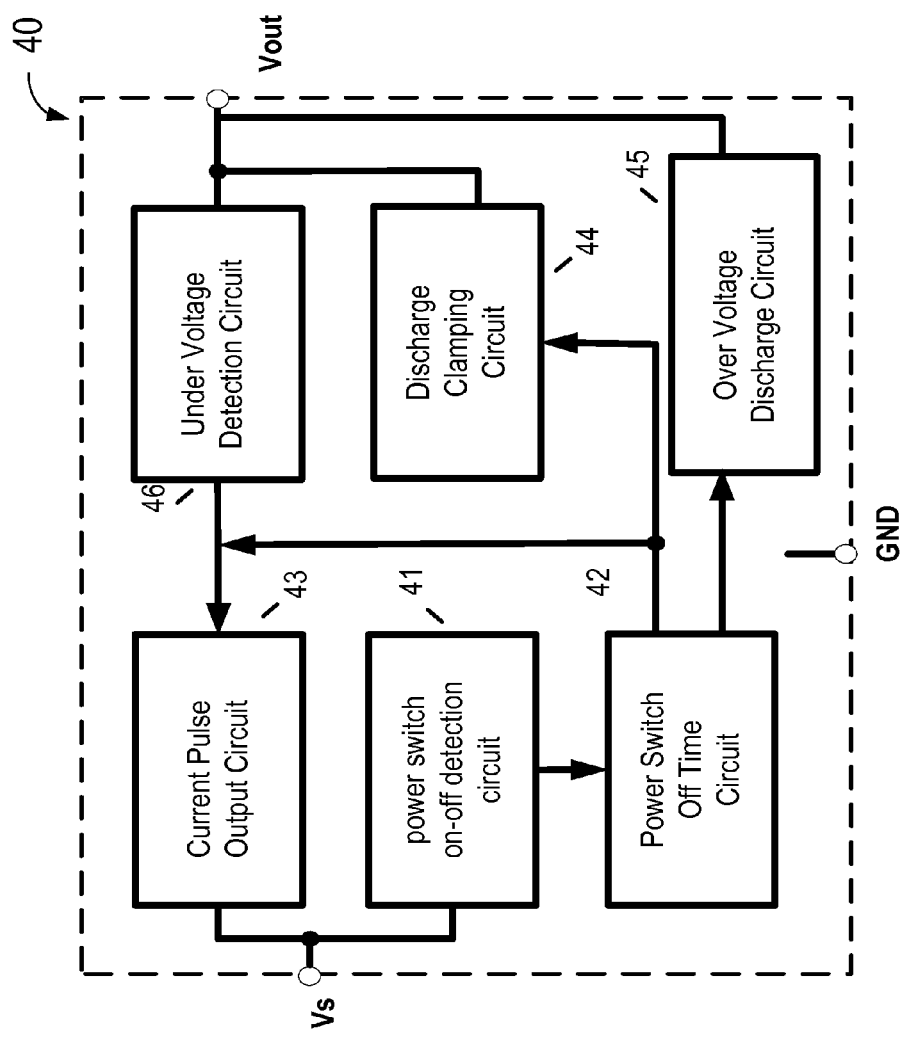
FIG. 2 is a simplified block diagram illustrating secondary-side control circuit according to some embodiments of the present invention.

Embodiments of the invention provide methods and circuits for suppressing system output voltage overshoot and stabilizing the output voltage. The standby power consumption can also be lowered FIG. 2 is a simplified block diagram illustrating secondary-side control circuit 40 according to some embodiments of the present invention. Secondary-side control circuit 40 is an example that can be used as secondary-side control circuit 26 in FIG. 1. As shown in FIG. 2, secondary-side control circuit 40 includes three terminals: Vs for coupling to the secondary-side winding, Vout for coupling to the SMPS output and corresponding to VDD in FIG. 1, and GND for coupling to the ground terminal of secondary winding. Control circuit 40 includes several blocks as shown in FIG. 2. Under voltage detection circuit 46 is coupled to Vout to detect a low voltage condition, and is also coupled to a current pulse output circuit 43, which is coupled to Vs. A power switch on-off detection circuit 41 is coupled top Vs and also to a power switch off time circuit 42. Discharge clamp circuit 44 is coupled to Vout and power switch off time circuit 42. An over-voltage discharge circuit 45 is coupled to power switch off time circuit 42 and Vout, and is configured to suppressing overshoot and over-voltage conditions.

Figure 3:
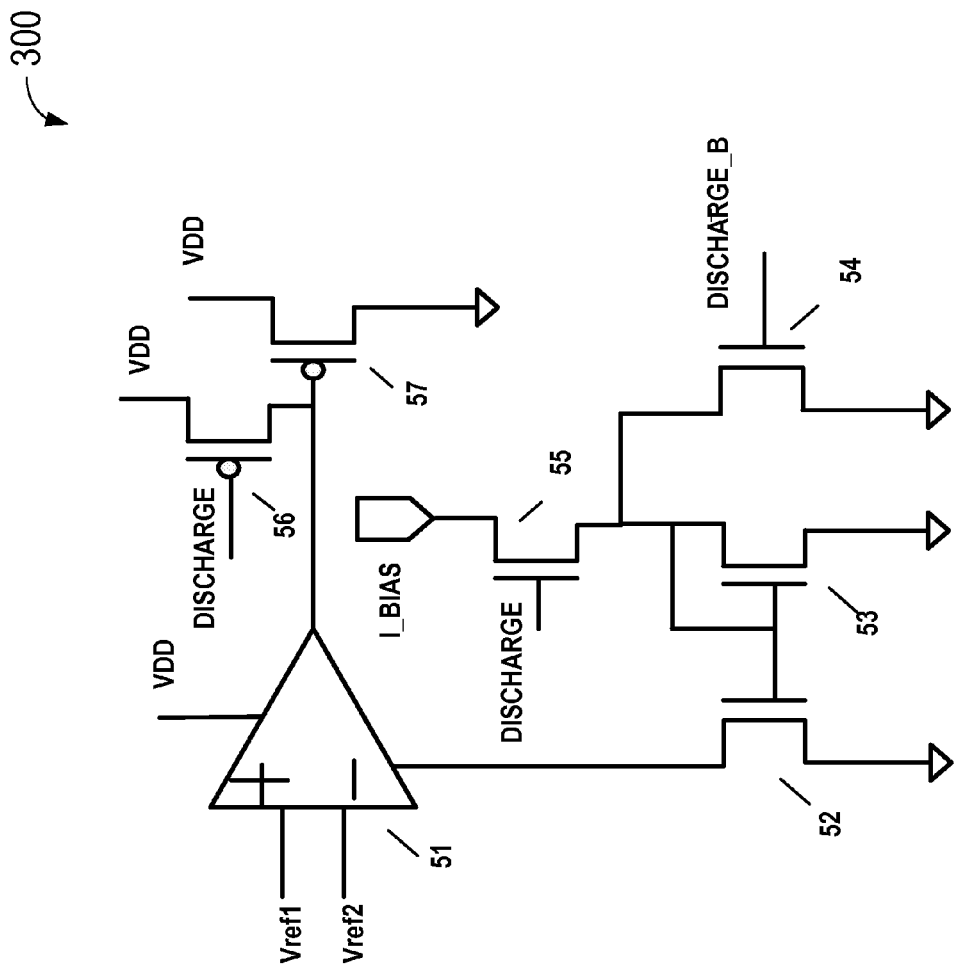
FIG. 3 is a simplified circuit schematic diagram illustrating an over voltage discharge circuit according to some embodiments of the present invention.

FIG. 3 is a simplified circuit schematic diagram illustrating an over voltage discharge circuit 300, which is an example of over-voltage discharge circuit 45 of FIG. 2, according to some embodiments of the present invention. The functions of over voltage discharge circuit 300 are described below with reference to the block diagram of FIG. 2 and the waveform diagram of FIG. 6. As shown in FIG. 3, over voltage discharge circuit 300 includes a comparator 51 with two input terminals receiving two input reference voltage signals, Vref1 and Vref2, respectively. In the embodiment shown in FIG. 3, Vref1 is coupled to the positive input terminal of comparator 51 and Vref2 is coupled to the negative input terminal of comparator 51. Further, Vref1 is set to be lower than Vref2. As a result, the output of comparator 51 is low.

In FIG. 3, PMOS transistor 57 is the discharging transistor, through which VDD is discharged. When discharge control signal DISCHARGE is high, PMOS transistor 56 is off. The low output of comparator 51 turns on transistor 57, and VDD is discharged through transistor 57. FIG. 3 also shows the enabling circuit for comparator 51, which includes a current source I_Bias and transistors 52, 52, 54, and 55. When discharge control signal DISCHARGE is high, NMOS transistor 55 is on, as are NMOS transistors 52 and 53. Under this condition, comparator 51 is enabled. When discharge control signal DISCHARGE is low, comparator 51 is disabled, and PMOS transistor 56 is turned on, causing discharge transistor 57 to turn off, stopping the discharge of VDD. The generation of discharge control signal DISCHARGE is described below with reference to FIG. 4.

Figure 4:
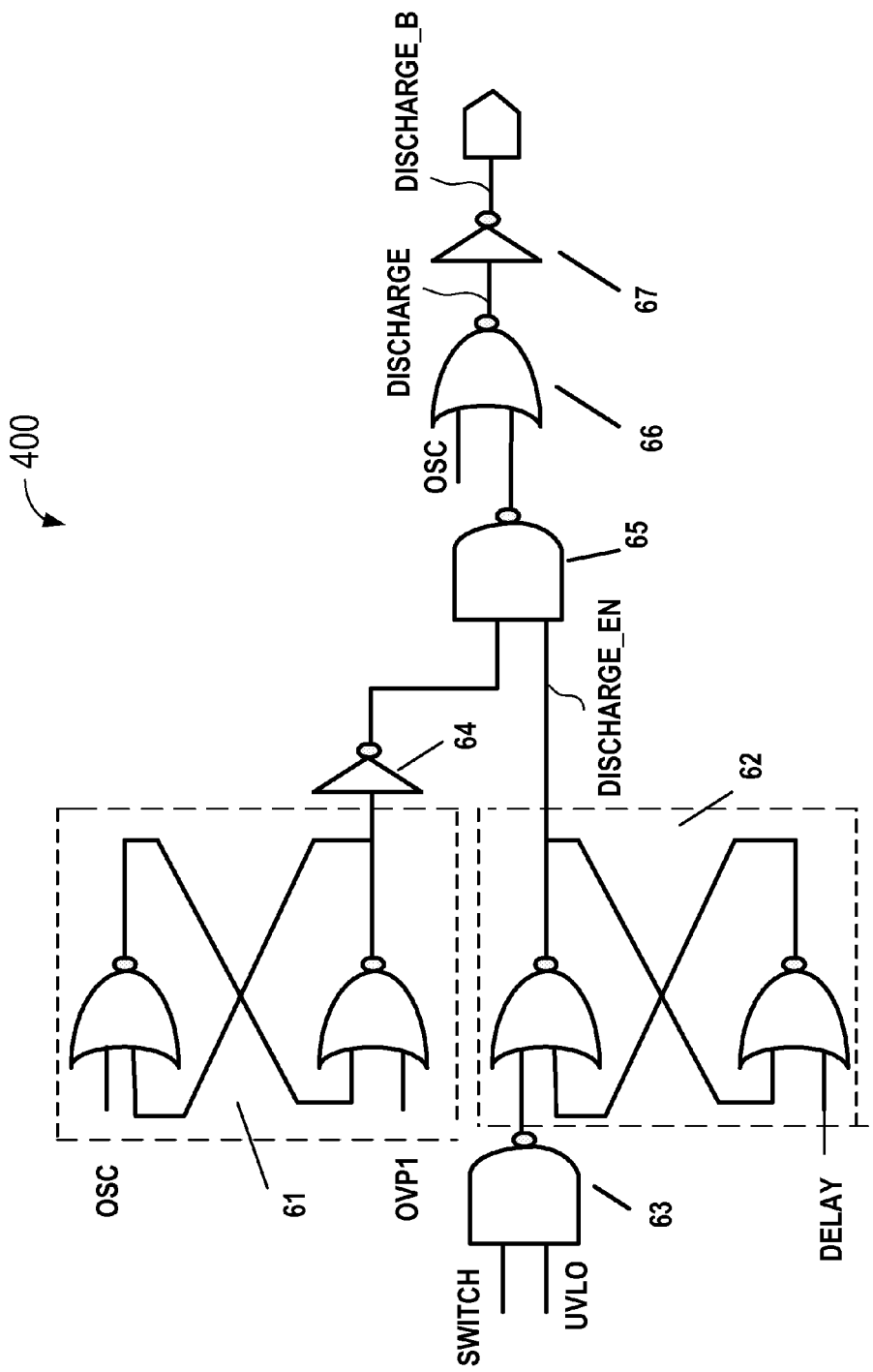
FIG. 4 is simplified circuit schematic diagram illustration the generation of discharge control signal according to some embodiments of the present invention.
Figure 6:
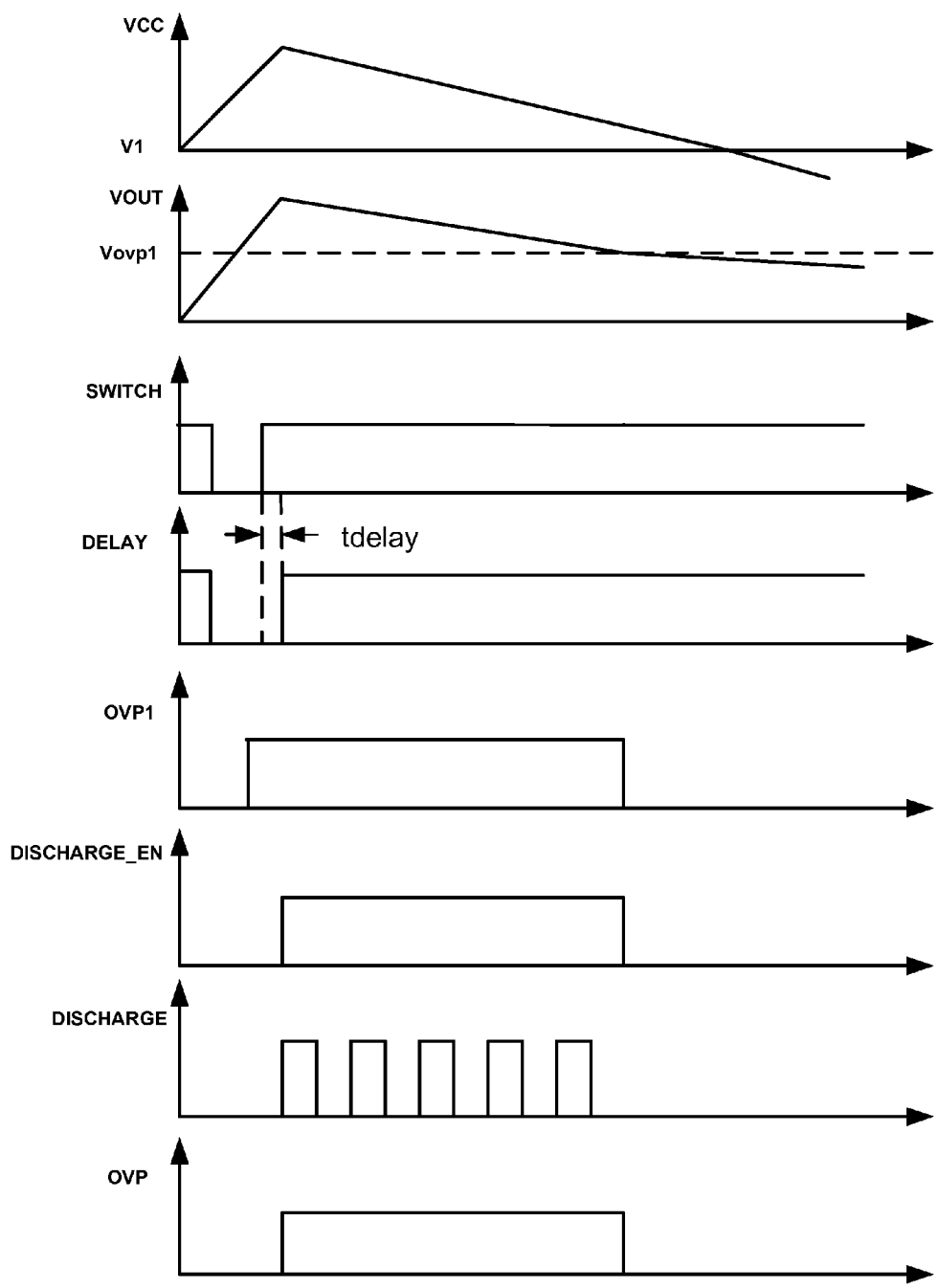
FIG. 6 is a waveform diagram illustrating several signals in the secondary-side control circuit of FIG. 2 according to some embodiments of the present invention.

FIG. 4 is simplified circuit schematic diagram illustration the generation of discharge control signal DISCHARGE. The DISCHARGE signal generator 400 includes two RS flip-flops 61 and 62, NAND gates 63 and 65, invertors 64, and 67, and NOR gate 66. The functions of DISCHARGE signal generator 400 is explained with reference to the waveforms shown in FIG. 6. Several input signals are involved in the generation of discharge control signal DISCHARGE. OSC is the periodic signal produced by an internal oscillator in the secondary side controller. Flip-Flop 61 is by OSC. The SWITCH signal is a reset or zeroing signal, and discharge is allowed when the SWITCH signal is high. In an embodiment, the SWITCH signal is generated by power switch on-off detection circuit 41. The primary-side control signal pulse causes a negative pulse in the SWITCH signal, as shown in FIG. 6. The UVLO is an under voltage signal generated by under voltage detection circuit 46.

As shown in FIG. 6, Vout is compared to an overvoltage reference signal Vovp1. When system output voltage Vout is higher than a pre-set over-voltage reference voltage Vovp1, the OVP1 signal is at a high level or a logic "1". At this point, the output of RS flip-flop 61 is a low level or a logic "0". Invertor 64 changes this signal to a high level logic "1" which, after passing through NAND gate 65, becomes a low-level or logic "0". NAND gate 65 also receives the output of flip-flop 62, the DISCHARGE_EN signal. The DISCHARGE_EN signal is generated in flip-flop 62, with input signals SWITCH, UVLO, and DELAY. As shown in FIG. 6, a pre-set delay time "tdelay" is controlled by signal DELAY. The DIS-CHARGE signal is provided at the output of NOR gate 66, which also receives the OSC clock signal as an input. As a result, discharge control signal DISCHARGE is a periodic pulsed signal as shown in FIG. 6. In some embodiments, the discharge signal can be a single signal with a duration of several clock signals.

In some embodiments, the discharge circuit is configured such that the discharging action is stopped when VDD is lowered to Vref2. Thus, VDD is prevented from discharging all the way to the ground.

Figure 5:
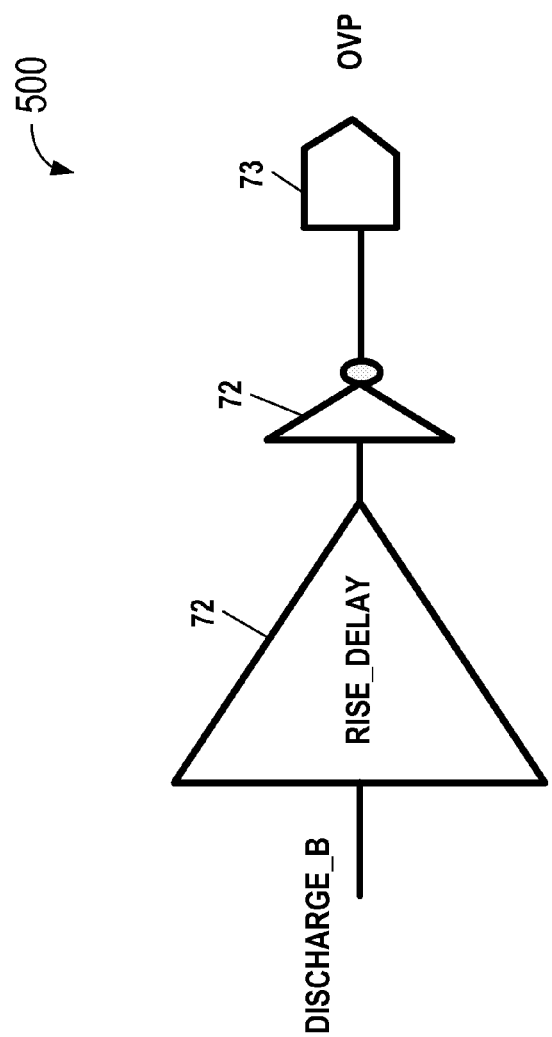
FIG. 5 is a simplified schematic diagram illustrating a circuit for generating an OVP signal according to some embodiments of the present invention.

FIG. 5 is a simplified schematic diagram illustrating a circuit 500 for generating an OVP signal. As shown, receives as input the DISCHARGE_B signal input signal is coupled to a rise-delay circuit 71 and invertor 72 to produce an output signal OVP 73. In some embodiments, OVP signal 73 is used prevents primary-side control circuit 10 from issuing control pulse to activate the power switch when discharge is occurring on the secondary side. During overshoot or over-voltage, the Vs terminal of secondary side controller is prevented from sending pulse signals, and the primary side does not transfer energy to the secondary side.

The above description is illustrative and not restrictive. Many variations of the invention will become apparent to those skilled in the art upon review of this disclosure. The scope of the invention should, therefore, not be limited the above description.

What is claimed is:

1. A switching mode power supply (SMPS), comprising:
   a transformer having:
      a primary winding for coupling to an input power source;
      a secondary winding for providing an output voltage of the SMPS; and
      an auxiliary winding;
   a power transistor coupled to the primary winding;
   a primary side control circuit coupled to the auxiliary winding and the power transistor, the primary side control circuit being configured to regulate the output of the SMPS by controlling the power switch in response to a feedback voltage signal that is representative of an output of the SMPS; and
   a secondary-side control circuit coupled to the secondary winding and being configured to cause the output voltage of the SMPS to discharge when the output voltage of the SMPS is higher than a first overvoltage reference voltage;
   wherein the secondary-side control circuit comprises a discharge control circuit having a power supply terminal coupled to the output voltage of the SMPS, the discharge control circuit being configured to issue a discharge signal;
   wherein the discharge control circuit comprises a comparator having a negative input coupled to the second reference voltage and a positive input coupled to a third reference voltage that is lower than the second reference voltage, the comparator also having a power supply terminal coupled to the output voltage of the SMPS.

2. The switching mode power supply of claim 1, wherein the discharge control circuit is configured to provide a signal to cause the primary side control circuit to temporarily stop regulating the output of the SMPS when discharge is occurring on the secondary side.

3. The switching mode power supply of claim 1, wherein the discharge control circuit further comprises a first transistor coupling the power supply terminal of the discharge control circuit to a ground terminal, the first transistor also having a control terminal coupled to an output of the comparator.

4. The switching mode power supply of claim 1, wherein the discharge control circuit further comprises a second transistor coupling the power supply terminal of the discharge control circuit to the output of the comparator.

5. The switching mode power supply of claim 4, wherein the second transistor of the discharge control circuit is controlled by a first and a second flip-flops, the first flip-flop being coupled to a signal indicating that the output voltage of the SMPS is higher than the first overvoltage reference voltage and the second flip-flop being coupled to a delay signal.

6. The switching mode power supply of claim 1, wherein the discharge control circuit is configured such that the output voltage prevented from discharging to below the second reference voltage.

7. The switching mode power supply of claim 1, wherein the primary side control circuit is a pulse width modulated (PWM) controller.

8. The switching mode power supply of claim 1, wherein the primary side control circuit is a pulse frequency modulated (PFM) controller.

9. A three-terminal device for controlling a switching mode power supply (SMPS), comprising
a first terminal for coupling to the output of the switching mode power supply;
a second terminal for coupling to a secondary side ground of the SMPS;
a third terminal for coupling to a secondary winding of the SMPS;
a discharge control circuit coupled to the first terminal, the discharge control circuit being configured to issue a discharge signal to cause a voltage at the first terminal to discharge to the second terminal when the voltage at the first terminal is higher than a first overvoltage reference voltage;
wherein the discharge control circuit includes a comparator having a negative input coupled to the second reference voltage and a positive input coupled to a third reference voltage that is lower than the second reference voltage, the comparator also having a power supply terminal coupled to the output voltage of the SMPS.

10. The device of claim 9, wherein the discharge control circuit further comprising a first transistor coupling the first terminal to the second terminal, the first transistor also having a control terminal coupled to an output of the comparator.

11. The device of claim 9, wherein the discharge control circuit further comprises a second transistor coupling the first terminal to the output of the comparator.

12. The device of claim 11, wherein the second transistor is controlled by a first and a second flip-flops, the first flip-flop being coupled to a signal indicating that the voltage at the first terminal is higher than the first overvoltne reference voltage and the second flip-flop being coupled to a delay signal.

13. A method of controlling the output of a switching mode power supply (SMPS), the SMPS including a transformer having a primary winding coupled to a power switch, a secondary winding for providing an output, and an auxiliary winding, the method comprising:
on the primary side of the transformer, regulating the output of the SMPS by controlling the power switch in response to a feedback voltage signal that is representative of an output of the SMPS; and
on the secondary side of the transformer, causing the output voltage of the SMPS to discharge when the output voltage of the SMPS is higher than a first overvoltage reference voltage;
generating a pulsed discharge signal to cause the discharge;
wherein generating the pulsed discharge signal comprises detection when the output voltage of the SMPS is higher than the first overvoltage reference voltage and combining the result of the detection with a delay signal and a clock signal.

14. The method of claim 13, further comprising providing a discharge control circuit that includes a comparator having a negative input coupled to the second reference voltage and a positive input coupled to a third reference voltage that is lower than the second reference voltage, the comparator also having a power supply terminal coupled to the output voltage of the SMPS.

15. The method of claim 14, the discharge control circuit further comprising a first transistor coupling the power supply terminal of the discharge control terminal to a ground terminal, the first transistor also having a control terminal coupled to an output of the comparator.

16. The method of claim 13, further comprising temporarily halting the regulating of the output of the SMPS from the primary side, when discharge is occurring on the secondary side.

* * * * *